United States Patent
Hwang (10) Patent No.: US 12,498,305 B2
(45) Date of Patent: Dec. 16, 2025

(54) COOLING DEVICE FOR TISSUE

(71) Applicant: SAMSUNG MEDICAL CENTER, Seoul (KR)

(72) Inventor: Sunguk Hwang, Seoul (KR)

(73) Assignee: Samsung Medical Center, Seoul (KR)

( * ) Notice: Subject to any disclaimer, the term of this patent is extended or adjusted under 35 U.S.C. 154(b) by 339 days.

(21) Appl. No.: 18/022,444

(22) PCT Filed: Aug. 18, 2021

(86) PCT No.: PCT/KR2021/010941
§ 371 (c)(1),
(2) Date: Apr. 10, 2023

(87) PCT Pub. No.: WO2022/039487
PCT Pub. Date: Feb. 24, 2022

(65) Prior Publication Data
US 2023/0314294 A1    Oct. 5, 2023

(30) Foreign Application Priority Data
Aug. 18, 2020 (KR) .................. 10-2020-0103432

(51) Int. Cl.
*G01N 1/42* (2006.01)
(52) U.S. Cl.
CPC ..................... *G01N 1/42* (2013.01)
(58) Field of Classification Search
CPC .. G01N 1/42; G01N 1/30; G01N 1/36; G01N 2001/315; G01N 2035/00425; C12M 41/14; A61B 18/02; A61F 7/00; B65D 81/18; F25D 1/02
See application file for complete search history.

(56) References Cited

U.S. PATENT DOCUMENTS

| | | | |
|---|---|---|---|
| 7,604,782 B1 * | 10/2009 | Dingell | F25B 19/00 23/294 R |
| 2010/0058777 A1 | 3/2010 | Walter | |
| 2013/0240181 A1 * | 9/2013 | Yasunaga | F28D 15/00 165/104.28 |

FOREIGN PATENT DOCUMENTS

| | | | |
|---|---|---|---|
| CN | 206699253 U | * | 12/2017 |
| CN | 206911446 U | * | 1/2018 |
| JP | 2010-066263 A | | 3/2010 |
| JP | 6195531 B2 | | 8/2017 |

(Continued)

OTHER PUBLICATIONS

International Search Report and Written Opinion mailed Dec. 3, 2021 in International Application No. PCT/KR2021/010941.

(Continued)

*Primary Examiner* — Frantz F Jules
*Assistant Examiner* — Martha Tadesse
(74) *Attorney, Agent, or Firm* — Knobbe, Martens, Olson & Bear, LLP (57) ABSTRACT

Provided is a cooling device for tissue, the cooling device including a body portion having a receiving portion formed therein, the receiving portion receiving a cassette portion, a connection portion rotatably connected to the body portion, a cooling portion that is coupled to the connection portion, rotates together in conjunction with rotation of the connection portion, is arranged in the receiving portion, and has a controllable temperature, and a mat portion connected to the cooling portion, wherein a fluid is impregnated into the mat portion.

8 Claims, 8 Drawing Sheets

(56) References Cited

FOREIGN PATENT DOCUMENTS

| | | |
|---|---|---|
| JP | 2018-537069 A | 12/2018 |
| KR | 10-2003-0022997 A | 3/2003 |
| KR | 10-0975320 B1 | 8/2010 |
| KR | 10-2016-0024119 A | 3/2016 |
| KR | 10-2018-0061317 A | 6/2018 |
| KR | 10-2230794 B1 | 3/2021 |
| WO | WO 2017/059273 A1 | 4/2017 |

OTHER PUBLICATIONS

Office Action dated Nov. 23, 2020 in Korean Application No. 10-2020-0103432.
Notice of Allowance dated Dec. 21, 2020 in Korean Application No. 10-2020-0103432.

\* cited by examiner

COOLING DEVICE FOR TISSUE

TECHNICAL FIELD

Embodiments of the present disclosure relate to a cooling device for tissue.

BACKGROUND ART

In general, a method of examining a tissue includes a processing process in which a tissue subject to examination is placed in a cassette and paraffin is absorbed into the tissue, an embedding process in which the tissue is solidified together with paraffin so that the processed tissue can be cut to a thickness for tissue examination, a cutting process in which the cassette with solidified paraffin liquid is fixed to a slicing device to cut the solidified paraffin liquid into a tissue having a preset thickness, and an examination process in which the processed and cut tissue is melted to be examined.

Before cutting the tissue that is solidified with paraffin, a tissue softening operation is performed, which is a process of softening paraffin of a block and tissues having different hardnesses by using a fluid such as water.

In the related art, tissue is placed directly on ice or a cooling plate for the softening operation; however, ice melts quickly at room temperature and thus it is difficult to maintain a constant temperature suitable for cutting, and when ice is placed directly on the cooling plate, since there is no separate fluid, it requires an additional process to bring the fluid into contact with the tissue, and then move the tissue to the cooling plate and lower the temperature, and then perform the cutting, which is cumbersome.

The background art of the present disclosure is disclosed in Japanese Patent Registration No. 6195531 (registered on Aug. 25, 2017, title of the invention: Processing Device for Acting on Histological Samples).

DISCLOSURE

Technical Problem

The present disclosure provides a cooling device for tissue, whereby a tissue may be softened by using a mat portion impregnated with a fluid, and cooled to a preset temperature to manufacture a tissue that is easy to cut.

Technical Solution

According to an embodiment of the present disclosure, a cooling device for tissue is provided, the cooling device including a body portion having a receiving portion formed therein, the receiving portion receiving a cassette portion, a connection portion rotatably connected to the body portion, a cooling portion that is coupled to the connection portion, rotates together in conjunction with rotation of the connection portion, is arranged in the receiving portion, and has a controllable temperature, and a mat portion connected to the cooling portion, wherein a fluid is impregnated into the mat portion.

In the present disclosure, the cooling portion may extend in a preset direction, and a position of the cooling portion may be fixed to the connection portion.

In the present disclosure, the cooling portion may be perpendicular to the connection portion, and may be connected to the connection portion.

In the present disclosure, the cooling portion may include a plurality of cooling portions, and the plurality of cooling portions may be arranged apart from each other and connected to the connection portion.

In the present disclosure, the cooling device may further include a control portion installed in the body portion and electrically connected to the cooling portion and control the driving of the cooling portion.

In the present disclosure, the cooling device may further include a temperature sensor portion that is installed in the body portion and measures a temperature of the cooling portion.

In the present disclosure, the cooling device may further include a display portion that is installed on the body portion and displays a temperature of the receiving portion by receiving an electrical signal from the temperature sensor portion.

In the present disclosure, the temperature sensor portion may be electrically connected to the control portion, and the control portion may control driving of the cooling portion by receiving information about temperature from the temperature sensor portion as an electrical signal.

In the present disclosure, the cooling portion may be penetrated through and inserted into the mat portion.

In the present disclosure, a seating portion in the form of a groove may be formed on one surface of the mat portion facing the cooling portion, and the seating portion of the mat portion may be in contact with the cooling portion, and be arranged on the cooling portion.

According to embodiments of the present disclosure, a cooling device for tissue is provided, the cooling device including a body portion having a receiving portion formed therein, a cassette portion that is arranged on a bottom surface of the receiving portion formed in the body portion, and has a tissue received therein, and a connection portion rotatably connected to the body portion, a cooling portion that is coupled to the connection portion, rotates together in conjunction with rotation of the connection portion, is arranged in the receiving portion, and has a controllable temperature, and a mat portion connected to the cooling portion.

In the present disclosure, a fluid may be impregnated into the mat portion.

In the present disclosure, the cooling portion may be penetrated through and inserted into the mat portion.

In the present disclosure, a seating portion in the form of a groove may be formed on one surface of the mat portion facing the cooling portion, and the seating portion of the mat portion may be in contact with the cooling portion, and may be arranged on the cooling portion.

In addition to the aforesaid details, other aspects, features, and advantages will be clarified from the following drawings, claims, and detailed description.

Advantageous Effects

According to a cooling device for tissue, according to the present disclosure, a block in which tissues are received with a fixative or the like is not in direct contact with a cooling portion, but with a fluid-impregnated mat portion, thereby making the block soft due to cooling by the fluid and thus allowing continuous cutting to a constant thickness.

In addition, compared to a case where a fluid is directly received in a receiving portion and a block is immersed in the fluid, the immersed block may be easily separated from the fluid when the fluid is frozen due to the cooling of the cooling portion.

In addition, damage to the block due to dew condensation may be prevented in the process of separating the block from the fluid.

BEST MODE

According to an embodiment of the present disclosure, a cooling device for tissue is provided, the cooling device including a body portion having a receiving portion formed therein, the receiving portion receiving a cassette portion, a connection portion rotatably connected to the body portion, a cooling portion that is coupled to the connection portion, rotates together in conjunction with rotation of the connection portion, is arranged in the receiving portion, and has a controllable temperature, and a mat portion connected to the cooling portion, wherein a fluid is impregnated into the mat portion.

Mode for Invention

As the present disclosure allows for various changes and numerous embodiments, particular embodiments will be illustrated in the drawings and described in detail in the written description. The effects and features of the present disclosure, and ways to achieve them will become apparent by referring to embodiments that will be described later in detail with reference to the drawings. However, the present disclosure is not limited to the following embodiments but may be embodied in various forms.

Hereinafter, embodiments of the present disclosure will be described in detail with reference to the accompanying drawings, and in the description with reference to the drawings, like reference numerals refer to like elements and redundant descriptions thereof will be omitted.

It will be understood that although the terms "first," "second," etc. may be used herein to describe various elements, these elements should not be limited by these terms. These terms are only used to distinguish one element from another.

Singular expressions, unless defined otherwise in contexts, include plural expressions.

In the embodiments below, it will be further understood that the terms "comprise" and/or "have" used herein specify the presence of stated features or elements, but do not preclude the presence or addition of one or more other features or elements.

In the embodiments below, it will be understood when a portion such as a layer, an area, or an element is referred to as being "on" or "above" another portion, it can be directly on or above the other portion, or intervening portion may also be present.

Also, in the drawings, for convenience of description, sizes of elements may be exaggerated or contracted. For example, since sizes and thicknesses of elements in the drawings are arbitrarily illustrated for convenience of explanation, the following embodiments are not limited thereto.

When an embodiment is implementable in another manner, a predetermined process order may be different from a described one. For example, two processes that are consecutively described may be substantially simultaneously performed or may be performed in an opposite order to the described order.

In the following embodiments, when layers, regions, or elements are described as being connected, other layers, this indicates not only a case where layers, regions, and elements are directly connected but also a case where layers, regions, and elements are indirectly connected with other layers, regions, and elements therebetween. For example, herein, when layers, regions, or elements are described as being electrically connected, this indicates not only a case where layers, regions, and elements are directly electrically connected but also a case where layers, regions, and elements are indirectly electrically connected with other layers, regions, and elements therebetween.

Figure 1:
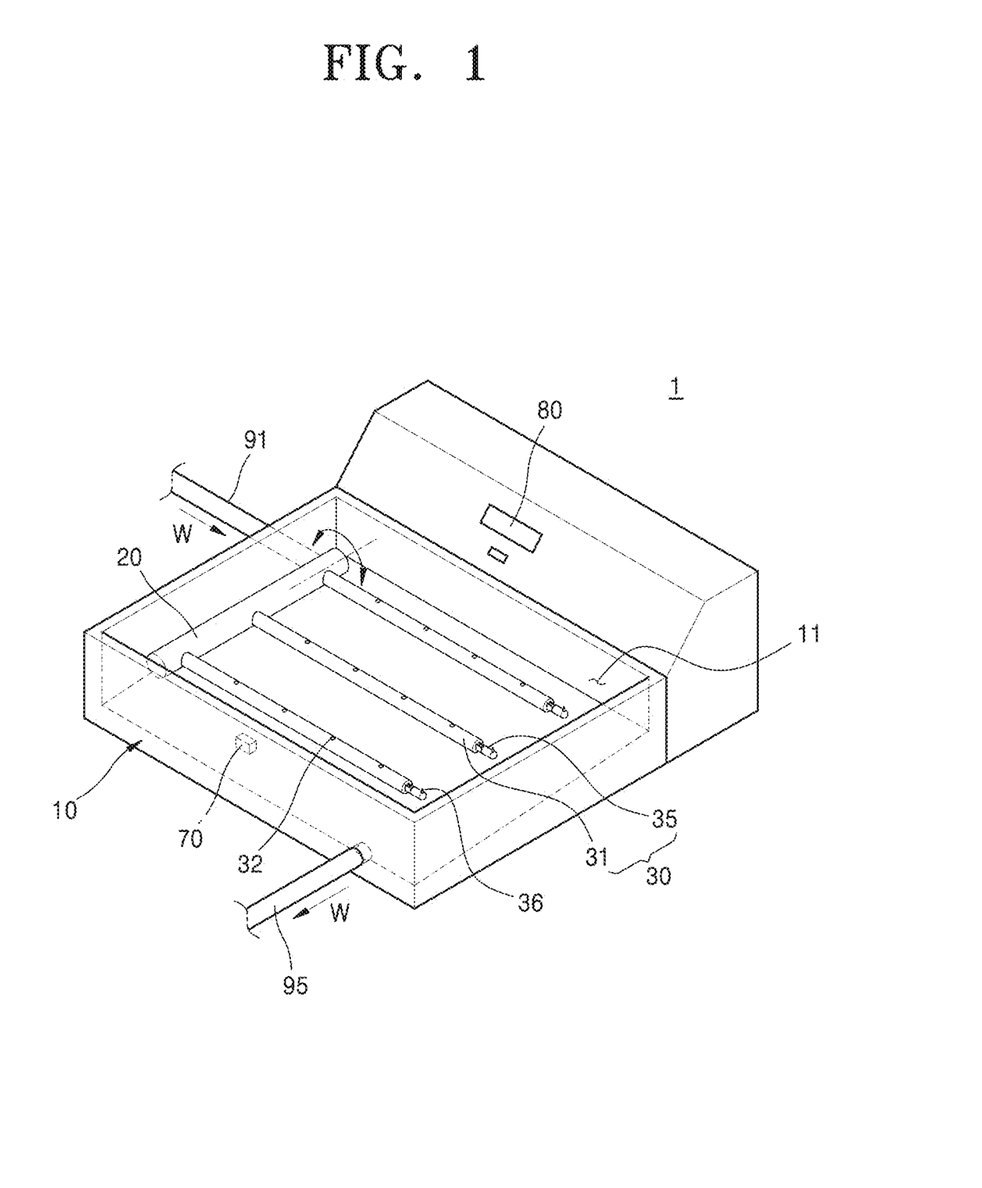
FIG. 1 is a perspective view of a cooling device for tissue, according to an embodiment of the present disclosure.
Figure 2:
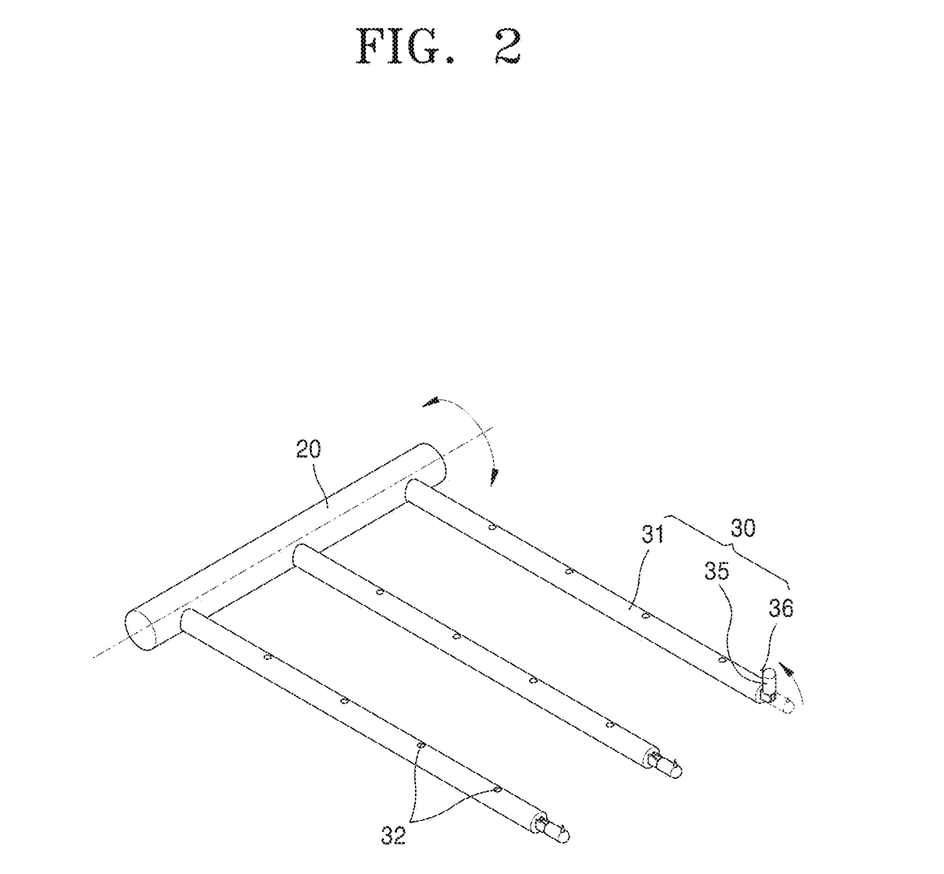
FIG. 2 illustrates a state in which a connection portion is rotated in a cooling device for tissue, according to an embodiment of the present disclosure.
Figure 3:
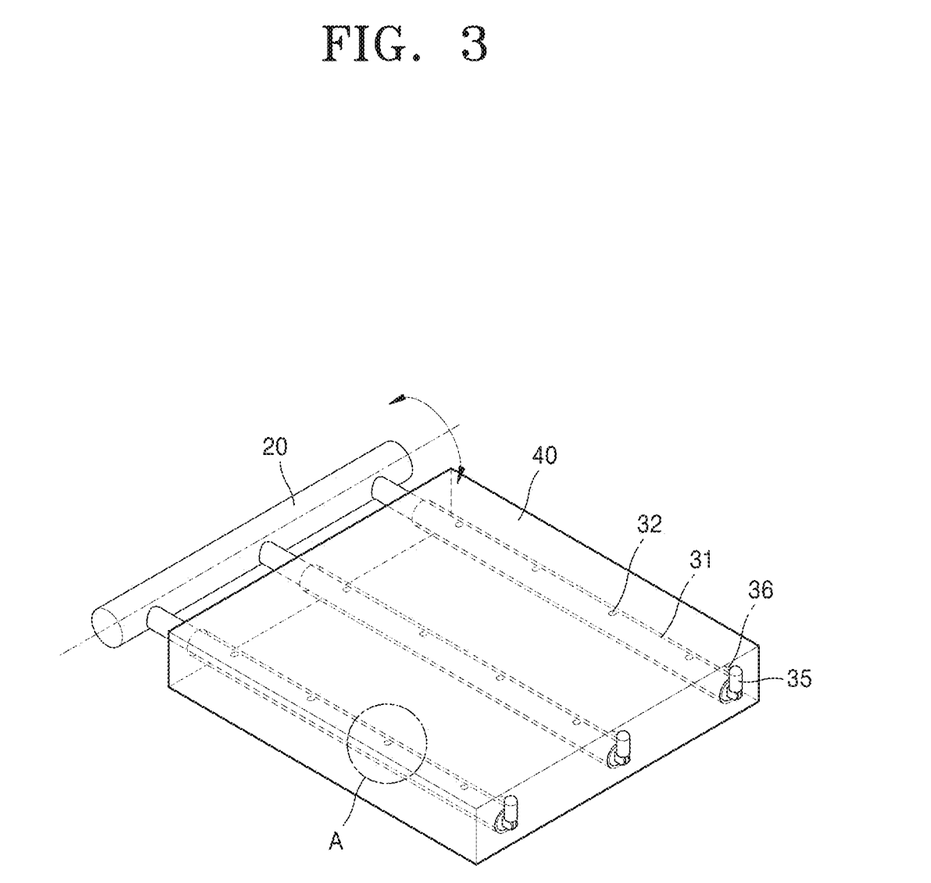
FIG. 3 illustrates a state in which a mat portion is connected to a cooling portion, according to an embodiment of the present disclosure.
Figure 4:
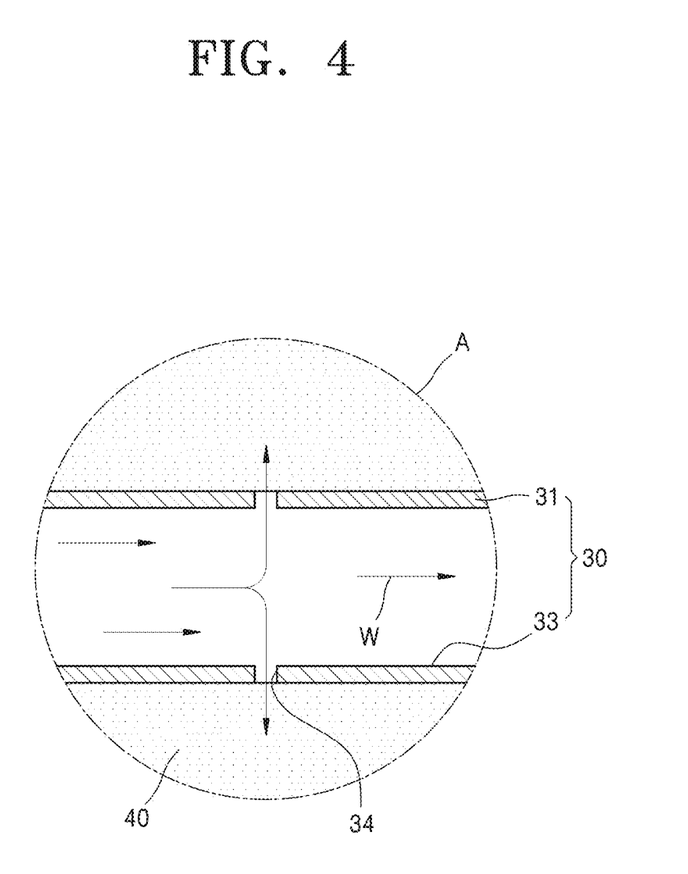
FIG. 4 is an enlarged view of portion A of FIG. 3.
Figure 5:
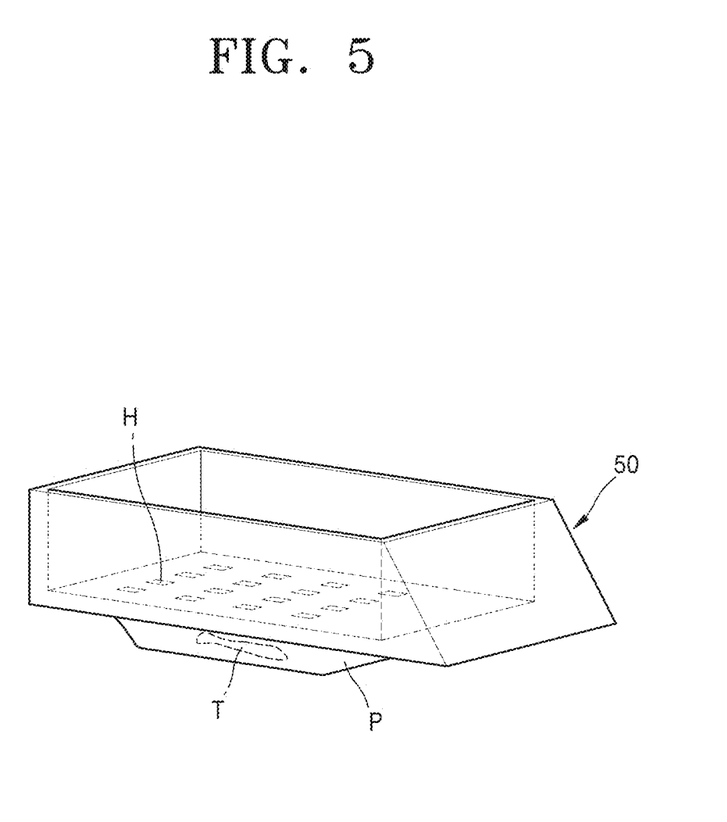
FIG. 5 is a perspective view of a cassette portion according to an embodiment of the present disclosure.
Figure 6:
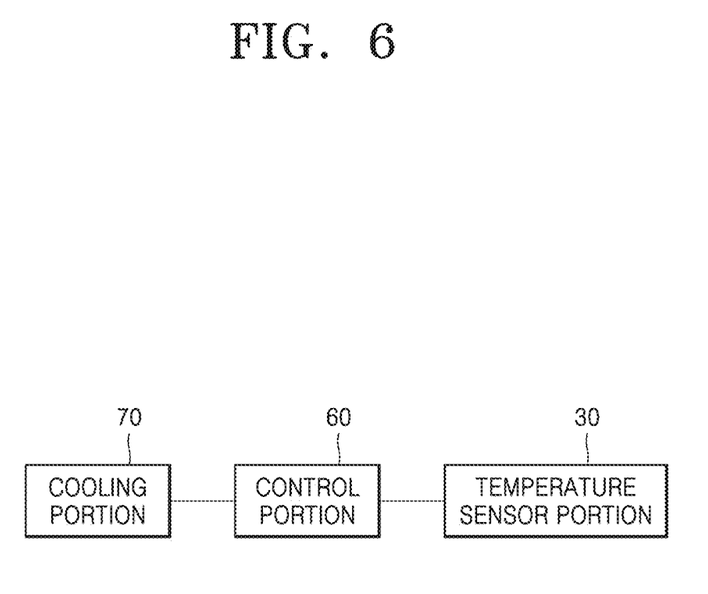
FIG. 6 is a structural block diagram of a control portion according to an embodiment of the present disclosure.
Figure 7:
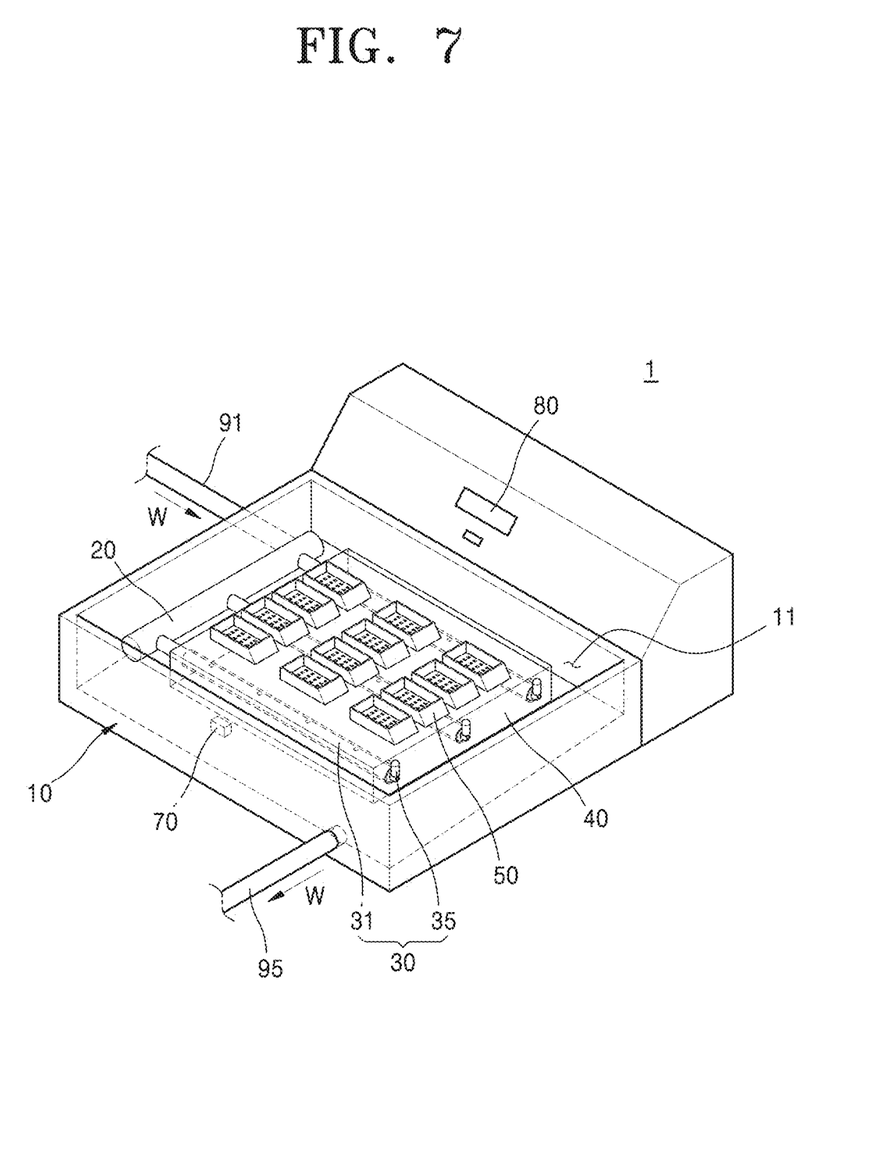
FIG. 7 is a perspective view of a cooling device for tissue, according to an embodiment of the present disclosure, in which a cassette portion is arranged.

FIG. 1 is a perspective view of a cooling device for tissue, according to an embodiment of the present disclosure. FIG. 2 illustrates a state in which a connection portion is rotated in a cooling device for tissue, according to an embodiment of the present disclosure. FIG. 3 illustrates a state in which a mat portion is connected to a cooling portion, according to an embodiment of the present disclosure. FIG. 4 is an enlarged view of portion A of FIG. 3. FIG. 5 is a perspective view of a cassette portion according to an embodiment of the present disclosure. FIG. 6 is a structural block diagram of a control portion according to an embodiment of the present disclosure. FIG. 7 is a perspective view of a cooling device for tissue, according to an embodiment of the present disclosure, in which a cassette portion is arranged.

Referring to FIGS. 1 to 7, a cooling device 1 for tissue, according to an embodiment of the present disclosure may include a body portion 10, a connection portion 20, a cooling portion 30, a mat portion 40, a cassette portion 50, a control portion 60, a temperature sensor portion 70, and a display portion 80.

Referring to FIGS. 1 and 7, the body portion 10 according to an embodiment of the present disclosure corresponds to the external appearance of the cooling device 1 for tissue, and may have a receiving portion 11 formed therein.

Referring to FIGS. 1 and 7, the connection portion 20, the cooling portion 30, the mat portion 40, and the cassette portion 50, which will be described later, may be arranged in the receiving portion 11 received in the body portion 10.

Referring to FIG. 1, the body portion 10, specifically, a lower surface portion of the receiving portion 11, may be inclined, and with respect to one side of the body portion 10 where the temperature sensor portion 70 is installed, as a front side, the lower surface portion may be inclined downwardly from the back, which is the other side of the body portion 10 where the display portion 80 is installed, toward the front side.

As the lower surface portion of the receiving portion 11 is inclined downwardly toward the front side, a fluid W in the receiving portion 11 may stably flow out through a discharge passage 95 to the outside.

Although not illustrated in the drawings, the lower surface portion of the receiving portion 11 may be formed to be inclined downward from left to right with respect to the front where the temperature sensor portion 70 is installed, and a discharge groove (reference numeral not set) connected to the discharge passage 95 may be formed in a direction from the left to the right.

Accordingly, the fluid W in the receiving portion 11 may stably flow to the discharge passage 95 along the discharge groove and be discharged to the outside.

Referring to FIGS. 1 and 7, a supply passage 91 may be installed in the body portion 10. The fluid W may flow into the body portion 10 from the outside through the supply passage 91, and a tissue T may be cooled as the temperature is maintained at a relatively low level by the cooling portion 30 to be described later.

Referring to FIGS. 1 and 7, in the present disclosure, the supply passage 91 penetrates through the body portion 10 and communicates with the connection portion 20 and the cooling portion 30, and the cooling portion 30 discharges the fluid W to the outside, but is not limited thereto, and the supply passage 91 may penetrate through the body portion 10 and discharge the fluid W to the receiving portion 11 so that the mat portion 40 may contain the fluid W and the temperature of the mat portion 40 may be lowered by the cooling portion 30.

The supply passage 91 according to an embodiment of the present disclosure may be connected to a rear side of the body portion 10 (see FIG. 1). Accordingly, when the fluid W is directly discharged to the body portion 10, specifically, the receiving portion 11, through the supply passage 91, the fluid W may flow from the rear side to the front side along the lower surface portion of the receiving portion 11 and may be input to the mat portion 40.

Referring to FIGS. 1 and 7, the connection portion 20 may be rotatably connected to the body portion 10 according to an embodiment of the present disclosure, and the cooling portion 30, the temperature of which is controlled, may be coupled to the connection portion 20.

The mat portion 40 to be described later may be connected to the cooling portion 30, and at least one cassette portion 50 may be sequentially disposed on the mat portion 40 into which the fluid W is impregnated by the driving of the cooling portion 30. As the cooling portion 30 is driven, the temperature of the cassette portion 50 on which the tissue T is disposed may be lowered to be appropriate for cutting of the tissue T.

The control portion 60 may be installed in the body portion 10, and may be electrically connected to the connection portion 20 and the cooling portion 30 to be described later, to transmit and receive electrical signals, and control the driving of the connection portion 20 and the cooling portion 30.

Referring to FIGS. 1 to 3 and 7, the connection portion 20 according to an embodiment of the present disclosure is rotatably connected to the body portion 10, and may rotate clockwise or counterclockwise with a longitudinal axis as a central axis of rotation.

The connection portion 20 may be electrically connected to the control portion 60, and driving thereof may be controlled by receiving an electrical signal from the control portion 60.

However, the present disclosure is not limited thereto, and the central axis of rotation of the connection portion 20 may be rotatably coupled to the body portion 10, or a user may manually rotate the connection portion 20 clockwise or counterclockwise, or other various modifications may be made.

Referring to FIGS. 1 to 3, the cooling portion 30 may be coupled to the connection portion 20. The cooling portion 30 may be coupled to the connection portion 20 and be fixed thereto, and accordingly, the cooling portion 30 may also be rotated in conjunction with the clockwise or counterclockwise rotation of the connection portion with respect to the central axis of rotation.

Referring to FIGS. 2 and 3, by rotating the connection portion 20 relative to the body portion 10, a user may expose a certain area of the cooling portion 30 coupled to the connection portion 20, outside the body portion 10, specifically, outside the receiving portion 11, and connect the mat portion 40 to the cooling portion 30.

As the mat portion 40 is connected to the cooling portion 30 and then the connection portion 20 is rotated again, the connection portion 20, the cooling portion 30 coupled to the connection portion 20, and the mat portion 40 connected to the cooling portion 30 may be arranged inside the body portion 10, specifically, inside the receiving portion 11.

After that, the user may arrange the at least one cassette portion 50 on the mat portion 40, and as the mat portion 40 impregnated with the fluid W flowing into the body portion 10 from the outside through the supply passage 91 is cooled, the tissue T located in the cassette portion 50 may be cooled to a temperature at which cutting is easy.

At least one cooling portion 30 may be vertically connected to the connection portion 20 according to an embodiment of the present disclosure.

In detail, the cooling portion 30 may be connected vertically with respect to a central axis of the longitudinal direction of the connection portion 20, and thus, the mat portion 40 may be stably connected to the cooling portion 30 and rotated clockwise or counterclockwise about the central axis of the longitudinal direction of the connection portion 20 as the central axis of rotation and disposed in the receiving portion 11.

Referring to FIG. 1, the connection portion 20 according to an embodiment of the present disclosure may be connected to the supply passage 91, and the fluid W introduced through the supply passage 91 may flow into the connection portion 20, and the fluid W may flow into the cooling portion 30 communicating with the connection portion 20, specifically, to a flow passage portion 33.

The fluid W may be discharged to the outside through at least one discharge portion 34 formed in the flow passage portion 33, and the mat portion 40 connected to the cooling portion 30 may be impregnated with the fluid W.

Accordingly, while the temperature of the cooling portion 30, specifically, the cooling body 31, is adjusted, the temperature of the mat portion 40 connected to the cooling portion 30 may be lowered, and the tissue T in the cassette portion 50 arranged on the mat portion 40 may be maintained at a temperature that is easy for cutting.

Referring to FIGS. 1 to 4 and 7, the cooling portion 30 according to an embodiment of the present disclosure may be coupled to the connection portion 20, and may be rotated together in conjunction with the rotation of the connection portion 20, and be arranged in the receiving portion 11 and the temperature thereof may be controlled.

Referring to FIGS. 1 to 4 and 7, the cooling portion 30 according to an embodiment of the present disclosure may include the cooling body 31, the flow passage portion 33, and a fixing portion 35.

Referring to FIGS. 1 to 4, the cooling body 31 according to an embodiment of the present disclosure is coupled to the connection portion 20 and may have a hollow inner portion. The cooling body 31 according to an embodiment of the present disclosure may receive power from the outside and control the temperature of the mat portion 40 so as to cool the tissue T located on the mat portion 40.

A separate refrigerant may be installed in the cooling body 31, a fan, etc. may be installed, and a component of the cooling portion 30 that is in contact with the mat portion 40 to lower the temperature of the mat portion 40 corresponds to well-known technology, and detailed description thereof is omitted.

As the cooling portion 30 according to an embodiment of the present disclosure is disposed within the mat portion 40, direct contact between the cooling portion 30 and the tissue T or a fixative P may be prevented.

Moreover, when the cooling portion 30 and the tissue T are in direct contact with each other, water may be filled in the receiving portion 11 to a certain height, and the tissue T may be submerged in the water filled in the receiving portion 11, and damage to the tissue T during a process of removing the tissue T due to the freezing of the water may be prevented.

The cooling body 31 according to an embodiment of the present disclosure may be disposed outside the mat portion 40, lower the temperature of the mat portion 40, and indirectly lower the temperature of the cassette portion 50 which is storing the tissue T, through the mat portion 40.

Referring to FIG. 4, the flow passage portion 33 according to an embodiment of the present disclosure may be located inside the cooling body 31 and receive the fluid W from the outside to form a flow passage of the fluid W to the outside.

The flow passage portion 33 may be integrally formed with the cooling body 31, but is not limited thereto, and may be formed as a separate component from the cooling body 31 and coupled to an inner circumferential surface of the cooling body 31. As such, various modifications may be made within the scope in which the fluid W flows inside the cooling body 31.

The cooling portion 30 according to an embodiment of the present disclosure, specifically, the cooling body 31, may extend in a preset direction and be fixed to the connection portion 20. A plurality of cooling portions 30, specifically, a plurality of cooling bodies 31, may be provided, and the plurality of cooling bodies 31 may be spaced apart from each other and connected to the connection portion 20.

Referring to FIGS. 2 and 3, at least one hole 32 may be formed in an outer circumferential surface of the cooling body 31 according to an embodiment of the present disclosure. The hole 32 formed in the cooling body 31 communicates with the discharge portion 34 formed in the flow passage portion 33, and the fluid W flowing inside the flow passage portion 33 may pass through the discharge portion 34 and the hole 32 and discharged to the outside.

Accordingly, the fluid W discharged from the cooling portion 30 to the outside may be impregnated into the mat portion 40 connected to the cooling portion 30, and the temperature of the tissue T in contact with the mat portion 40 may be lowered to a certain temperature suitable for cutting.

Referring to FIGS. 1 to 3, the fixing portion 35 according to an embodiment of the present disclosure is rotatably connected to the cooling body 31, and may have a fixing protrusion 36 protruding from the fixing portion 35 at a preset angle at an outer end thereof.

The fixing protrusion 36 may have a cross-sectional area decreasing outwardly with respect to the longitudinal axis.

As the fixing portion 35 according to an embodiment of the present disclosure is rotatably coupled to the cooling body 31, the cooling body 31 and the fixing portion 35 may pass through a hole formed in the mat portion 40, and the fixing portion 35 may be rotated so that the fixing protrusion 36 is driven into the mat portion 40 and thus a position of the mat portion 40 is stably fixed.

In addition, as the cross-sectional area of the fixing protrusion 36 decreases toward the outside with respect to a central longitudinal axis, insertion and fixation into the mat portion 40 becomes easy, and the position of the mat portion 40 may be stably fixed.

Referring to FIGS. 3 and 7, the mat portion 40 according to an embodiment of the present disclosure is connected to the cooling portion 30, and may have holes into which the cooling portion 30 may be inserted. At least one hole formed in the mat portion 40 may be provided to correspond to at least one cooling portion 30.

Referring to FIGS. 1 and 3, as the connection portion 20 is driven, the connection portion 20 is rotated relative to the body portion 10 and a certain area of the cooling portion 30 is exposed to the outside of the body portion 10, and the user may connect the mat portion 40 to the cooling portion 30 such that the cooling portion 30 is inserted through the mat portion 40.

Again, while the connection portion 20 is rotated clockwise (refer to FIG. 3) with the longitudinal axis as the central axis of rotation, the mat portion 40 may be disposed inside the body portion 10, specifically, the receiving portion 11.

The mat portion 40 according to an embodiment of the present disclosure may be impregnated with the fluid W such as water, and as one surface of the mat portion 40 (upper surface in reference to FIG. 7) and the fixative P in which the tissue T is received are in direct contact with each other, the tissue T and the fixative P may be made soft due to the direct contact, subsequently enabling continuous cutting with a constant thickness.

Referring to FIGS. 3 and 7, the mat portion 40 according to an embodiment of the present disclosure may be disposed between the cassette portion 50 and the cooling portion 30. The mat portion 40 may be flat, one surface thereof (upper surface with respect to FIG. 7) may be connected to the cassette portion 50, and may contact a structure of the fixative P having the tissue T received therein (hereinafter, referred to as a 'block').

Since the mat portion 40 impregnated with the fluid W such as water is in contact with the block only on one surface thereof (upper surface with respect to FIG. 7), the fluid W impregnated in the mat portion 40 is cooled by the cooling portion 30, and in a case where the block and the mat portion 40 are attached to each other due to the cooling of the fluid W, the block and the cassette portion 50 may be easily removed from the mat portion 40, compared to the related art where the block and the cassette portion 50 are removed from the mat portion 40 while the fluid W is simply received in the receiving portion 11, and the block is submerged in water and cooled.

In addition, as the block is in contact with the upper surface (with respect to FIG. 7) of the mat portion 40 that is in direct contact with the cooling portion 30 from a lower side (with respect to FIG. 7), the temperature of the mat portion 40 may be indirectly lowered and the temperature may be maintained constant.

The mat portion 40 may include a sponge material. In detail, the mat portion 40 may include melamine resin foam, but it is not limited to this, and various modifications may be made as long as the fluid W is impregnated in the mat portion 40W.

Referring to FIGS. 3 and 7, in the mat portion 40 according to an embodiment of the present disclosure, holes may be formed along one direction so that the cooling portion 30 may pass therethrough, and the cooling portion 30 may penetrate through and be inserted into the holes.

Figure 8:
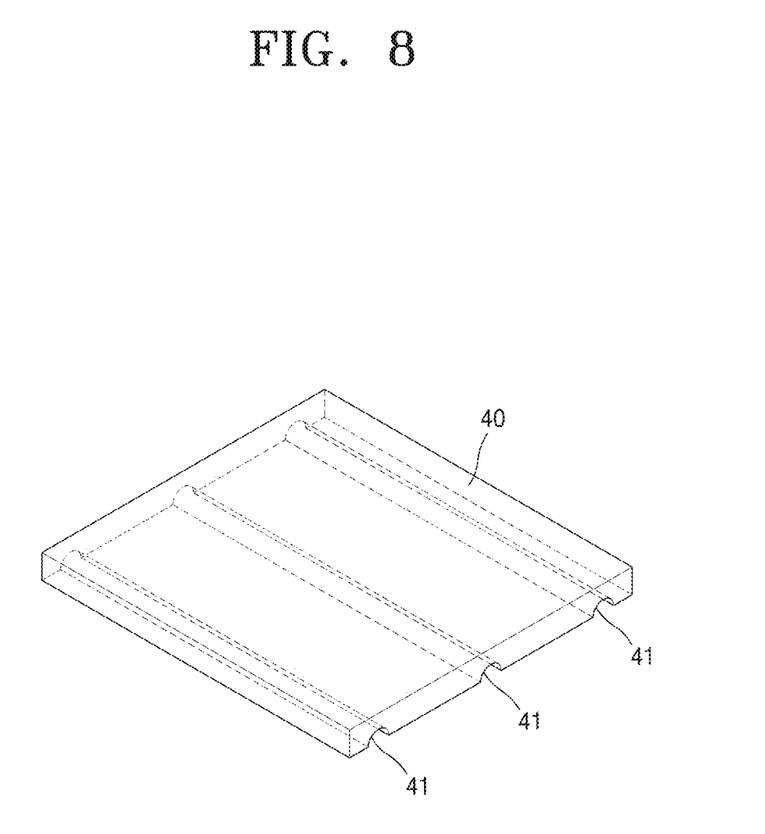
FIG. 8 is a perspective view of a mat portion according to another embodiment of the present disclosure.

However, the present disclosure is not limited thereto, and referring to FIG. 8, various modifications may be made; for example, a seating portion 41 in the form of a groove portion may be formed in one surface of the mat portion 40 facing the cooling portion 30 (bottom surface with respect to FIG. 8).

As the seating portion 41 formed in one surface of the mat portion 40 (bottom surface with respect to FIG. 8) is disposed in contact with the cooling portion 30, specifically, the cooling body 31, when the cooling portion 30 is driven, the temperature of the mat portion 40 impregnated with the fluid W may decrease.

Referring to FIGS. 5 and 7, the tissue T is received in the cassette portion 50 according to an embodiment of the present disclosure, and information about the received tissue T may be displayed on one surface of the cassette portion 50.

Referring to FIG. 5, at least one hole H may be formed in one surface of the cassette portion 50 according to an embodiment of the present disclosure, and the fixative P may pass through the hole H, and contact the tissue T disposed on one side of the cassette portion 50 (lower side with respect to FIG. 5), and as the fixative P is solidified, the tissue T may be received in the fixative P.

Referring to FIGS. 5 and 7, the cassette portion 50 according to an embodiment of the present disclosure may be disposed on the mat portion 40 and does not directly contact the cooling portion 30, and the temperature of the cassette portion 50 may be lowered through the mat portion 40, with which the cassette portion 50 is in direct contact.

Referring to FIG. 6, the control portion 60 according to an embodiment of the present disclosure is installed in the body portion 10, and may be electrically connected to the connection portion 20 and the cooling portion 30, and thus control the driving of the connection portion 20 and the cooling portion 30, respectively. The control portion 60 may control the temperature of a region formed in the receiving portion 11.

Referring to FIG. 6, the control portion 60 according to an embodiment of the present disclosure may receive temperature-related information from the temperature sensor portion 70 as an electrical signal, and when the temperature of the cooling portion 30 is higher than a preset temperature, the control portion 60 may control a driving portion of the cooling portion 30 to cool the mat portion 40 to a preset temperature.

Referring to FIGS. 1 and 7, the temperature sensor portion 70 according to an embodiment of the present disclosure is installed in the body portion 10, and may measure the temperature of the cooling portion 30. The temperature sensor portion 70 may be installed inside the body portion 10, measure the temperature of the cooling portion 30, and transmit an electrical signal to the control portion 60.

The control portion 60 may control driving of the cooling portion 30 such that the cooling portion 30 is cooled to a preset temperature, based on information about the temperature received from the temperature sensor portion 70.

Referring to FIGS. 1 and 7, the display portion 80 according to an embodiment of the present disclosure is installed on the body portion 10, and may be electrically connected to the temperature sensor portion 70, receive, from the temperature sensor portion 70, information about the temperature, and visually display the information.

Thus, the user may obtain real-time information about the temperature of the receiving portion 11 where the cassette portion 50 having received therein the tissue T is located, and manually operate the control portion 60 to control the driving of the cooling portion 30.

In the present disclosure, the display portion 80 is formed as a display to visually convey temperature-related information to the user, but is not limited thereto, and various modifications may be made; for example, the temperature-related information may be audibly conveyed through sound, etc.

Referring to FIGS. 1 and 7, the supply passage 91 according to an embodiment of the present disclosure is in communication with one side (left side with respect to FIG. 1) of the body portion 10, and may supply the fluid W from the outside to the mat portion 40.

However, the present disclosure is not limited thereto, and the supply passage 91 may be connected to the connection portion 20, and may supply the fluid W to the cooling portion 30 through the connection portion 20. The fluid W may flow along the flow passage portion 33 disposed inside the cooling portion 30, specifically, the cooling body 31, and the fluid W may flow to the outside through the discharge portion 34 formed in the flow passage portion 33 and the hole 32 formed in the cooling body 31.

The fluid W discharged to the outside may be impregnated into the mat portion 40, and the temperature of the mat portion 40 may decrease as the cooling body 31 is driven.

As described above, the mat portion 40 may be impregnated with the fluid W such as water, cooled by the cooling portion 30, and transfer the effect of this temperature decrease to a block received in the cassette portion 50.

The fluid W may be supplied to the inside of the receiving portion 11 from the outside through the supply passage 91, and the fluid W introduced into the receiving portion 11 through the supply passage 91 may be impregnated into the mat portion 40. The fluid W may be stably supplied to the mat portion 40 through the supply passage 91, and the cooling performance of the block may be improved.

Although not shown in the drawings, a valve may be installed in the supply passage 91, and the valve may control a flow rate of the fluid W flowing in the supply passage 91. The valve may be electrically connected to the control portion 60 and may be opened and closed by receiving an electrical signal from the control portion 60.

Referring to FIGS. 1 and 7, the supply passage 91 according to an embodiment of the present disclosure may be disposed upstream of the discharge passage 95 (rear side of FIG. 1), which will be described later, and accordingly, the fluid W flowing into the receiving portion 11 through the supply passage 91 may be prevented from flowing back into the supply passage 91 and flowing backward.

Referring to FIGS. 1 and 7, the discharge passage 95 according to an embodiment of the present disclosure communicates with the other side of the body portion 10 in which the supply passage 91 is installed, and the fluid W in the receiving portion 11 may be discharged to the outside.

Due to the discharge passage 95 according to an embodiment of the present disclosure, when a preset amount of the fluid W is impregnated into the mat portion 40 disposed in the receiving portion 11, the fluid W that is not impregnated in the mat portion 40 but is located inside the receiving portion 11 may be discharged to the outside.

Although not shown in the drawing, a valve may be installed in the discharge passage 95, and the valve may control a flow rate of the fluid W flowing on the discharge passage 95. The valve may be electrically connected to the control portion 60 and may be opened and closed by receiving an electrical signal from the control portion 60.

In the cooling device 1 for tissue, according to an embodiment of the present disclosure, the cooling portion 30 and the tissue T, specifically, a block, do not directly contact each other, but contact the mat portion 40 impregnated with the fluid W, and thus, the block may be made soft due to the cooling by the fluid W, and the block may be continuously cut to a constant thickness.

In addition, compared to a case where the fluid W is directly received in the receiving portion 11 and the block is immersed in the fluid W, the submerged block may be easily separated from the fluid W when the fluid W is frozen due to the cooling of the cooling portion 30.

In addition, damage to the block due to dew condensation may be prevented when separating the block from the fluid W.

In addition, as the supply passage 91 and the discharge passage 95 control the flow of the fluid W to the body portion 10, specifically, the receiving portion 11, a certain amount of the fluid W may be impregnated in the mat portion 40, and the cooling performance may be improved.

In addition, when a block is placed on the mat portion 40, only one surface of the block (lower surface with respect to FIG. 7) is in contact with the mat portion 40, without any portion of the block being submerged, and when the block that is in contact with the fluid W and the mat portion 40 impregnated with the fluid W is cooled due to the cooling of the cooling portion 30, dew condensation may be minimized when the block is removed from the mat portion 40 because the area in direct contact is limited.

In addition, the connection portion 20 is driven by receiving an electrical signal from the control portion 60, and as the connection portion 20 rotates relative to the body portion 10, the user may easily connect or disconnect the mat portion 40 to or from the connection portion 20.

In addition, the fixing portion 35 may be rotatably coupled to the cooling body 31, and rotated after connecting the mat portion 40 to the cooling body 31, and the mat portion 40 may be supported in a contacted state, and accordingly, the position of the mat portion 40 may be stably fixed.

In addition, the fluid W introduced through the supply passage 91 flows into the connection portion 20 and the passage portion 33 disposed inward relative to the cooling body 31, and is discharged through the discharge portion 34 formed in the passage portion 33, through the hole 32 formed in the cooling body 31, to the outside, and as the fluid W discharged to the outside is impregnated into the mat portion 40, the mat portion 40 may be effectively cooled by the cooling portion 30.

The particular implementations shown and described herein are illustrative examples of the present disclosure and are not intended to otherwise limit the scope of the present disclosure in any way. For the sake of brevity, conventional electronics, control systems, software development and other functional aspects of the systems may not be described in detail. Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device. Moreover, no item or component is essential to the practice of the present disclosure unless the element is specifically described as "essential" or "critical".

Therefore, the scope of the present disclosure is defined not by the described embodiments but by the appended claims and any equivalent ranges thereto, and all scopes equivalent to or equivalently changed from the claims as well as the claims described below shall be construed as being within the scope of the present invention.

INDUSTRIAL APPLICABILITY

The present disclosure is applicable to industry related to cooling devices for tissues.

The invention claimed is:

1. A cooling device for tissue, the cooling device comprising:
   a body portion having a receiving portion formed therein, the receiving portion configured to receive a cassette portion;
   a single connection portion rotatably connected to the body portion;
   a cooling portion coupled to the connection portion, configured to rotate together in conjunction with rotation of the connection portion, arranged in the receiving portion, and having a controllable temperature of the cooling portion; and
   a mat portion connected to the cooling portion and comprising a plurality of holes,
   wherein a fluid is configured to be impregnated into the mat portion, and
   wherein the cooling portion comprises a plurality of cooling portions respectively extending from different portions of a same side of the single connection portion in a first direction perpendicular to a central axis of the connection portion,
      wherein the plurality of cooling portions are spaced apart from each other in a second direction perpendicular to the first direction,
      wherein the plurality of cooling portions are rotatable about the central axis of the connection portion together with the connection portion, and
      wherein the plurality of cooling portions respectively penetrate the plurality of holes of the mat portion.

2. The cooling device of claim 1, further comprising a control portion installed in the body portion and electrically connected to the cooling portion and configured to control the driving of the cooling portion.

3. The cooling device of claim 2, further comprising a temperature sensor portion installed in the body portion and configured to measure a temperature of the cooling portion.

4. The cooling device of claim 3, further comprising a display portion installed on the body portion and configured to display a temperature of the receiving portion by receiving an electrical signal from the temperature sensor portion.

5. The cooling device of claim 3, wherein the temperature sensor portion is electrically connected to the control portion, and
   wherein the control portion is configured to control driving of the cooling portion by receiving information about temperature from the temperature sensor portion as an electrical signal.

6. The cooling device of claim 1, wherein a seating portion in a form of a groove is formed on one surface of the mat portion facing the cooling portion, and the seating portion of the mat portion is in contact with the cooling portion, and is arranged on the cooling portion.

7. A cooling device for tissue, the cooling device comprising:

a body portion having a receiving portion formed therein;

a cassette portion that is arranged on a bottom surface of the receiving portion formed in the body portion, and has a tissue received therein;

a single connection portion rotatably connected to the body portion;

a cooling portion coupled to the connection portion, configured to rotate together in conjunction with rotation of the connection portion, arranged in the receiving portion, and having a controllable temperature of the cooling portion; and a mat portion connected to the cooling portion, wherein a fluid is configured to be impregnated into the mat portion, wherein the cooling portion comprises a plurality of cooling portions respectively extending from different portions of a same side of the single connection portion in a first direction perpendicular to a central axis of the connection portion, wherein the plurality of cooling portions are spaced apart from each other in a second direction perpendicular to the first direction, wherein the plurality of cooling portions are rotatable about the central axis of the connection portion together with the connection portion, wherein the mat portion comprises a plurality of seating portions extending in the first direction on a bottom surface thereof and having groove shapes, and wherein the plurality of seating portions contact and at least partially accommodate the plurality of cooling portions, respectively.

8. The cooling device of claim 1, wherein a position of each of the plurality of cooling portions is fixed relative to the connection portion so that the plurality of cooling portions do not move relative to the connection portion.

* * * * *